(12) United States Patent
Talmat

(10) Patent No.: US 11,704,403 B2
(45) Date of Patent: Jul. 18, 2023

(54) DETECTING AND PREVENTING UNAUTHORIZED COMMAND INJECTION

(71) Applicant: ServiceNow, Inc., Santa Clara, CA (US)

(72) Inventor: Mohamed Sofiane Talmat, Utrecht (NL)

(73) Assignee: ServiceNow, Inc., Santa Clara, CA (US)

(*) Notice: Subject to any disclaimer, the term of this patent is extended or adjusted under 35 U.S.C. 154(b) by 86 days.

(21) Appl. No.: 16/951,993

(22) Filed: Nov. 18, 2020

(65) Prior Publication Data

US 2022/0156361 A1 May 19, 2022

(51) Int. Cl.
| | |
|---|---|
| *G06F 21/51* | (2013.01) |
| *G06F 21/56* | (2013.01) |
| *G06F 8/41* | (2018.01) |
| *G06F 8/77* | (2018.01) |
| *G06F 21/57* | (2013.01) |

(52) U.S. Cl.
CPC .............. *G06F 21/51* (2013.01); *G06F 8/433* (2013.01); *G06F 8/77* (2013.01); *G06F 21/563* (2013.01); *G06F 21/577* (2013.01); *G06F 2221/033* (2013.01)

(58) Field of Classification Search
CPC . G06F 21/51; G06F 8/433; G06F 8/77; G06F 21/563; G06F 21/577; G06F 2221/033
See application file for complete search history.

(56) References Cited

U.S. PATENT DOCUMENTS

| | | | | |
|---|---|---|---|---|
| 9,479,526 | B1* | 10/2016 | Yang | ................... H04L 63/1416 |
| 2010/0153785 | A1* | 6/2010 | Keromytis | .......... G06F 11/3688 |
| | | | | 714/38.11 |
| 2018/0081777 | A1* | 3/2018 | Sayre | .................. G06F 11/3612 |
| 2020/0404007 | A1* | 12/2020 | Singh | .................. H04L 63/1416 |
| 2021/0012021 | A1* | 1/2021 | Pickhardt | ................ G06F 21/53 |
| 2021/0158147 | A1* | 5/2021 | Vinod | ....................... G06N 3/08 |

OTHER PUBLICATIONS

GitHub—https://github.com/jalanb/jab/blob/master/src/bash/bash.bnf. Dec. 3, 2015.
GitHub—vorpaljs/bash-parser: Parses bash into an AST. https://github.com/vorpaljs/bash-parser. Nov. 24, 2017.
Syntax-based SQL Injection Detection. https://help.fortinet.com/fweb/580/Content/FortiWeb/fortiweb-admin/syntaxbased_sqli_detect.htm. Jun. 8, 2017.
The Open Group Base Specifications Issue 7, 2018 edition IEEE Std 1003.1-2017. https://pubs.opengroup.org/onlinepubs/9699919799/utilities/V3_chap02.html#tag_18_10, Jan. 31, 2018.

* cited by examiner

*Primary Examiner* — Kevin Bechtel
*Assistant Examiner* — Forrest L Carey
(74) *Attorney, Agent, or Firm* — Van Pelt, Yi & James LLP

(57) ABSTRACT

Input data for an operating system command of an automation process is received. The operating system command is generated based on the received input data. The generated operating system command is parsed to identify one or more metrics. The identified one or more metrics are automatically evaluated to determine a security risk associated with the generated operating system command.

20 Claims, 5 Drawing Sheets

DETECTING AND PREVENTING UNAUTHORIZED COMMAND INJECTION

BACKGROUND OF THE INVENTION

Automation of a workflow process can often increase the efficiency of performing the process. For example, converting a series of tasks to a digital and automated process can save a significant amount of time and resources. This can be especially true when the tasks are complex, repetitive, and/or include many individual steps. Another significant improvement is the ability to process dynamic input such as user-generated input using an automated process. For example, a user can provide an email address and a description of an incident report via a web form or email. An automated process can utilize the provided email address and description as inputs and automatically process the incident report with little to no administrator or operator intervention. The automated process can apply to a variety of different tasks such as business processes, structured activities that require specific sequences, process-oriented objectives, etc.

BRIEF DESCRIPTION OF THE DRAWINGS

Various embodiments of the invention are disclosed in the following detailed description and the accompanying drawings.

DETAILED DESCRIPTION

Figure 1:
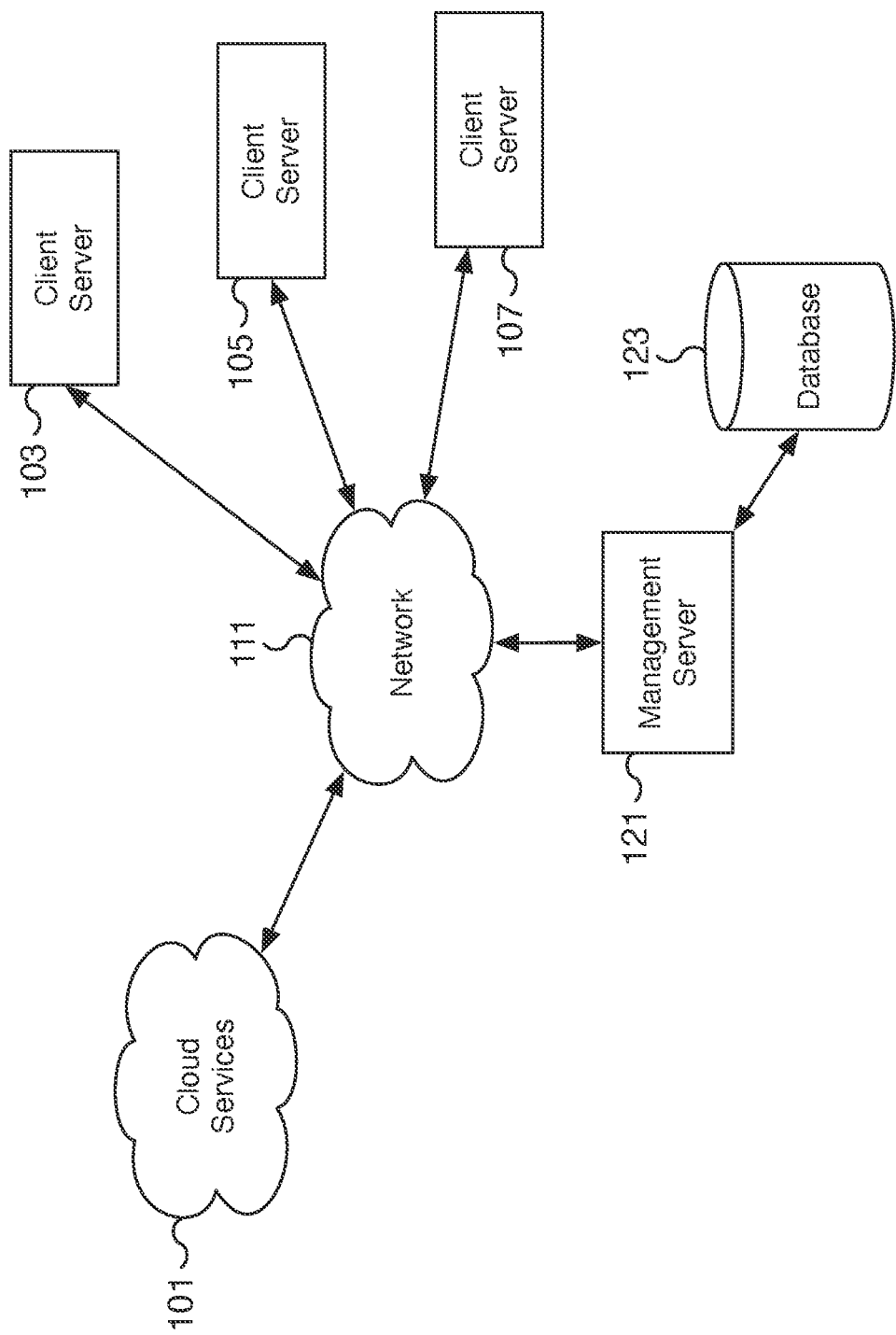
FIG. 1 is a block diagram illustrating an example of a network environment for detecting security risks in unauthorized commands.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The detection and prevention of unauthorized commands is disclosed. In various embodiments, operating system commands prepared for execution on hardware machines have the ability to introduce security risks. For example, automated tasks and in particular automated tasks that rely on dynamic input are vulnerable to command line injection attacks. Using the disclosed techniques, an automation process that runs an operating system command with user supplied or dynamically generated arguments is analyzed to minimize the security risk that unauthorized commands have been injected into the operating system command.

In some embodiments, an operating system command with arguments is automatically generated as part of an automation process. The arguments utilized can be dynamic. For example, an email address, a contact phone number, a description of a support incident, and other input data can be received from a web form. In some embodiments, the dynamically generated data is the output of another process. For example, a support ticket can be automatically assigned to one of several responsible parties. The assigned party is automatically determined and dynamically generated. It can be used as part of an automated process, for example, to provide the responsible party with a notification of the newly assigned support ticket. Using dynamically generated input, an operating system command is generated that takes the dynamically generated input as arguments.

As part of the automation process, a generated operating system command is analyzed to detect security flaws. In some embodiments, the automation process such as the automation script is parsed. The parsing can generate an execution tree that describes the execution order of the automation. In some embodiments, the execution tree is an abstract syntax tree. In some embodiments, an execution tree is created for each generated operating system command of the automation process. For example, an automation process or script may include multiple generated commands and an execution tree is generated for the entire automation process that includes corresponding execution sub-trees for each generated command. In some embodiments, execution trees may be generated only for the generated commands.

In various embodiments, an execution tree is used to identify security risks. Once generated, an execution tree can be analyzed to identify one or more metrics of a generated command. For example, an abstract syntax tree can be analyzed to identify the number of predicted processes that will be spawned from executing the generated command and/or the number of supplied arguments to the generated command. Other metrics or properties of the generated command can be identified as well, such as the command name and the user requesting execution of the command. In various embodiments, the identified metrics are compared to determine whether a security risk is associated with the generated command. In some embodiments, a behavior definitions dataset is created using definitions associated with authorized commands. The identified metrics of the generated command are then compared to metrics from the valid behavior definitions in the dataset. For example, the behavior definitions dataset can include definitions of valid execution behaviors such as the approved number of processes a command will spawn and/or the approved number of arguments a command can receive. As one example, an operating system command can be approved to spawn exactly three processes. In analyzing a generated operating system command, an execution tree created by parsing of the generated command is used to determine that five processes are predicted to be created by the generated command. The two extra processes exceed the approved number of processes for the command and a security risk is identified. In some embodiments, upon detecting a security risk, the generated operating system command is disallowed from being executed. For example, an operator is notified, and the generated command may be quarantined until an operator has reviewed the suspicious command. In some embodiments, a network session associated with the analyzed automation process with a detected security risk is invalidated. Similarly, an account, email address, IP Address, and/or other user/client property associated with the analyzed automation process with a detected security risk can be disabled. In some embodiments, the execution of the automation is blocked or throttled until an incident team can address the identified security threat.

In some embodiments, the results from the security threat analysis can be used to update or create a behavior definition. For example, a generated command that is analyzed and found to not contain a security threat can be used to create a valid behavior definition for the behavior definitions dataset. Execution of the generated command can be monitored, and characteristics of the command can be stored for later comparison. For example, the execution time, memory usage, CPU usage, network usage, and/or other properties can be monitored and stored as valid threshold ranges for an approved command. In some embodiments, the valid behavior definitions associated with commands are aged and expired after a certain number of executions and/or time has elapsed. For example, old definitions can be replaced by new and more current/recent definitions. In some embodiments, negative behavior definitions can be used as well. For example, an unauthorized command with an identified threat can be used to create a definition corresponding to an invalid behavior that is associated with a command. Whereas valid behavior definitions can be used to match and identify authorized commands, invalid behavior definitions can be used to match and identify unauthorized commands.

In some embodiments, a command can be initially treated as an unauthorized command and is only later identified as an authorized command with no security risk in the event the command matches a definition associated with an authorized command. In some embodiments, to be identified as an authorized command with no security risk, a command must also not match any definition associated with an unauthorized command. In some embodiments, a command may be initially treated as an authorized command and is only later identified as an unauthorized command with a security risk in the event the command matches a definition associated with an unauthorized command.

In some embodiments, input data for an operating system command of an automation process is received. For example, input data can be received via an email, online form, as the output of a business process, or via another appropriate input data collection technique. The input data can be an email address, a phone number, an address, a description associated with a support ticket, an assigned category for customer feedback, the contact number of a party assigned to an incident report, etc. The input data is fed into an automation process such as an automation script. The operating system command based on the received input data is generated. For example, the input data is used to create one or more arguments to pass to the operating system command. In some embodiments, the generated operating system command is parsed to identify one or more metrics. For example, identified metrics can include the number of spawned processes predicted by the generated operating system command and/or the number of arguments for the generated operating system command. The identified one or more metrics are automatically evaluated to determine a security risk associated with the generated operating system command. For example, in the event the number of processes the generated operating system command is predicted to spawn deviates from an approved number of processes, the generated operating system command is flagged as a security risk. As another example, in the event the number of arguments passed into the generated operating system command deviates from the approved number of arguments, the generated operating system command is also flagged as a security risk. In various embodiments, determining the security risk includes determining whether to allow execution of the generated operating system command. For example, in the event the generated operating system command is determined to spawn more processes than it is approved for, the generated operating system command is blocked from being executed. In automatically evaluating the identified one or more metrics, the identified one or more metrics can be compared with one or more historical reference metrics. For example, a valid execution behavior dataset is created to track valid metrics. The valid metrics can include history reference metrics, such as run-time behavior characteristics, of previously approved executions of the same or related operating system commands.

FIG. 1 is a block diagram illustrating an example of a network environment for detecting security risks in unauthorized commands. In the example shown, cloud services 101, client servers 103, 105, and 107, and management server 121 are communicatively connected via network 111. Network 111 can be a public or private network. In some embodiments, network 111 is a public network such as the Internet. In some embodiments, client servers 103, 105, and/or 107 are on a private local network separate of cloud services 101. In some embodiments, management server 121 is also part of the local network of client servers 103, 105, and/or 107 although other network topologies are appropriate as well. In the example shown, cloud services 101 hosts cloud services such as configuration management database (CMDB) services. Services provided by cloud services 101 can include automation services, ticket processing, incident reporting, resource discovery, resource management, event management, cloud management, maintenance, and compliance services, among others.

In some embodiments, an administrator (or operator) can configure an automation process via cloud services 101. Cloud services 101 may be implemented by one or more servers and/or databases (not shown). In some embodiments, an administrator accesses the services via a user interface such as a web user interface. For example, an administrator can configure an automation to run on a target machine such as one or more of client servers 103, 105, and/or 107. The automation event can use dynamic data, for example, as input arguments. In the example shown, cloud services 101 can be utilized to collect user information such as email addresses, phone numbers, incident descriptions, support ticket requests, and travel reimbursement requests, among other dynamically generated data. An automation event is created by generating an automation process using the dynamically generated data. For example, an automation script is generated that includes generating one or more operating system commands to process the provided input data. In some embodiments, the input data can include the output of other processes. In various embodiments, cloud services 101 and/or management server 121 is used to manage and/or process the automation event.

In some embodiments, the administrator specifies one or more automation scripts that utilize client servers. In the example shown, the automation scripts are deployed using management server 121 to execute on client servers such as client servers 103, 105, and/or 107. For example, in various embodiments, management server 121 can securely connect to one or more client systems such as client servers 103, 105, and/or 107 and remotely deploy one or more automation scripts to execute on the target client systems. Prior to executing an automation script, management server 121 is configured to analyze the automation script to identify security risks. In the event a security risk is identified with the automation script, the administrator can be notified, and the automation script can be quarantined. Other actions to limit the security risk can be performed as well, such as invaliding a session, blocking an IP address or related network address, blocking an email address, and/or deactivating a user account associated with the requestor of the automation script. In the event no security risk is identified, the automation script can be authorized to execute and management server 121 can deploy the automation script to execute on one or more target client servers such as client servers 103, 105, and/or 107.

In the example shown, management server 121 is physically separated from cloud services 101 to denote the scenario where management server 121 can be in a different network location from cloud services 101. In may be appropriate, in some embodiments, for management server 121 to be part of and/or located with cloud services 101. In some embodiments, management server 121 is located on the same private network of client servers 103, 105, and/or 107 for improved security. For example, network connections between management server 121 and cloud services 101 related to service requests such as automation requests can require that the network connections originate from an internal network via management server 121 instead of allowing incoming requests to the internal network.

In some embodiments, client servers 103, 105, and/or 107 are example client hardware/software systems with potential different resources that require discovery and management. Client servers such as client servers 103, 105, and/or 107 may be Unix-based machines such as Linux servers or run another operating system such as Windows, MacOS, etc. In some embodiments, the client servers are Windows servers, desktop machines, routers, storage devices, virtual machines, etc. In various embodiments, the configurations of the different client servers are cataloged using cloud services 101 with a service such as a CMDB service. The resources available for each client server and its associated properties can be stored in a database such as database 123. In some embodiments, the information is stored in a CMDB database.

In some embodiments, database 123 is utilized to store information related to analyzing automation scripts for security risks. For example, database 123 can be used to store behavior definitions associated with operating system commands. Valid (and invalid) behavior definitions that describe scenarios associated with different potential security risks can be stored on database 123. Although database 123 is shown connected to management server 121, database 123 may be located in a variety of network locations as appropriate. For example, database 123 may be located external to a local network that includes client servers 103, 105, and/or 107 and management server 121. In some embodiments, database 123 is not directly connected to management server 121 but only communicatively connected to management server 121. Database 123 may also be used to store automation scripts, dynamic user input used to generate automation scripts, output from another process used to generate automation scripts, and/or other related data. In some embodiments, the behavior definitions dataset used to analyze operating system commands for security risks is a trained machine learning model and the machine learning model and related information are stored at database 123 or another appropriate data store. In some embodiments, database 123 is a cloud-based database server and may be part of and/or collocated with cloud services 101.

Although single instances of some components have been shown to simplify the diagram of FIG. 1, additional instances of any of the components shown in FIG. 1 may also exist. For example, cloud services 101 may include one or more different servers and/or multiple distributed components. Similarly, database 123 may include one or more database servers and may not be directly connected to management server 121. For example, database 123 and its components may be replicated and/or distributed across multiple servers, components, and/or locations. In some embodiments, components not shown in FIG. 1 may also exist.

Figure 2:
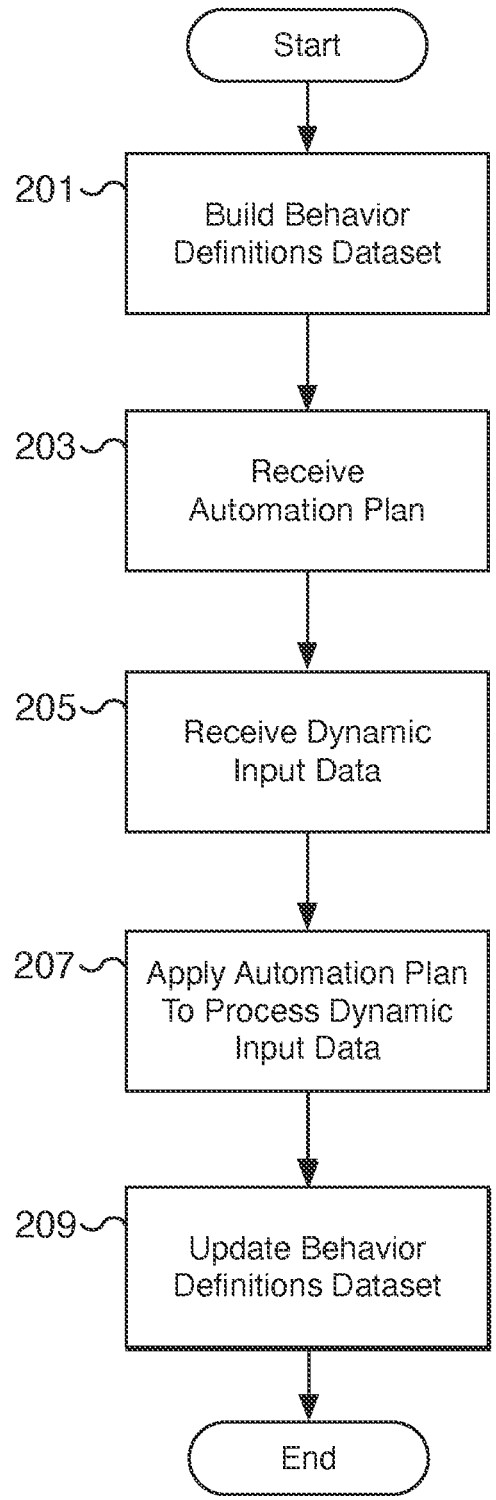
FIG. 2 is a flow chart illustrating an embodiment of a process for securely applying an automation plan.

FIG. 2 is a flow chart illustrating an embodiment of a process for securely applying an automation plan. Using the process of FIG. 2, as part of applying an automation plan, a script such as an automation script associated with an automation plan is analyzed to detect security risks. In the event a security risk is detected, an operator can be notified, and the script and automation plan quarantined. In the event no security risk is detected, the script and associated automation plan can be authorized for execution. In some embodiments, the process of FIG. 2 is performed by a security service running on a management server such as management server 121 of FIG. 1 and/or by a cloud service such as one of cloud services 101 of FIG. 1. In various embodiments, a definitions dataset used to identify security risks is stored in a data store such as database 123 of FIG. 1. Although described with respect to an automation plan, the process of FIG. 2 applies to any execution script and can be utilized to detect security risks associated with operating system commands.

At 201, a behavior definitions dataset is built. For example, a dataset of behavior definitions describing operating system commands is created. A behavior definition can describe the properties and/or characteristics associated with a valid (or invalid) operating system command. The properties can include one or more metrics associated with an operating system command and can be based on historical reference metrics. For example, a behavior definition can specify that an operating system command should spawn exactly three processes and receive two input arguments. As another example, a behavior definition can specify that an operating system command should never spawn more than two processes. Other properties can be specified in the definition as well. For example, a behavior definition may include appropriate values and/or threshold ranges associated with execution time, memory usage, CPU usage, network usage, and/or other properties for an operating system command. In some embodiments, the valid behavior definitions associated with commands are aged and expire after a certain number of executions or time has elapsed. For example, old definitions can be replaced by new and more current/recent definitions. In some embodiments, negative behavior definitions can be used as well. For example, an unauthorized command with an identified threat can be used to create a definition corresponding to an invalid behavior that is associated with a command. Whereas valid behavior definitions can be used to match and identify authorized commands, invalid behavior definitions can be used to match and identify unauthorized commands. In some embodiments, the dataset is a trained machine learning model.

At 203, an automation plan is received. For example, an operator can configure an automation plan to automate a business process using a cloud service. The automation plan can generate and/or utilize automation scripts that process dynamic data such as user generated data, outputs of other processes, or any other input data. In some embodiments, the dynamic data is used as input arguments and the automation plan is used to automate the processing of the input arguments. For example, a notification process can be automated to automatically email a support technician when an incident report is received and assigned. The output of an assignment process determines the appropriate support technician and retrieves the technician's email address. The automation plan can receive as input the email address of the assigned support technician for sending the technician an email notification with the appropriate incident report details. At 203, the automation plan is received and configured to utilize input data when the input data is made available.

At 205, dynamic input data is received. For example, dynamically generated data such as user generated data is received. For example, a user can submit an incident report via a web form. As another example, a user can submit an expense report via an expense reporting mobile application or chat bot. The expense report can include the user's name, contact information, receipt, and description of the expense. Each field of the submitted data can be utilized as input data for an automation task. Other examples of input data can include data generated from a business process or another task.

At 207, the automation plan is applied to process dynamic input data. For example, the automation plan received at 203 is applied to the input data received at 205. The input data can be fed into the automation plan, typically as input arguments. Using the example described at 203, one portion of an automation plan can receive the email address of the support technician assigned to resolve an incident report as input data. The automation plan can then be executed to email the support technician information related to a newly assigned incident report. As another example, the automation plan can receive a digital image of a receipt submitted as part of a travel expense as input that is then scanned and processed for reimbursement. Although more useful and typically applied for dynamically generated data, the automation plan can also be applied to static data. In applying the automation plan, one or more operating system commands are generated based on the provided input data. In some embodiments, an automation plan is implemented using an automation script that invokes one or more operating system commands on the provided input data. For each of these operating system commands, an operating system command is generated based on the input data. For example, an operating system command can be generated that takes as an input a single input data field. As another example, an operating system command is generated that takes three input data values as three separate input arguments. In processing the automation plan, the generated operating system commands are automatically evaluated for security risks, such as a command line injection attack. Risks can be identified by comparing the generated operating system command to the dataset of behavior definitions built at 201 and updated at 209. For example, in the event a generated operating system command matches a valid behavior definition, the command can be determined to have minimal security risk and is unlikely subject to a command line injection attack. In the event a security risk is identified, the automation plan is not approved. For example, the automation plan can be quarantined, an operator notified, and the automation plan blocked from being executed until manually approved by the operator. In the event no security risk is identified, the automation plan is approved and may be executed as applied.

At 209, the behavior definitions dataset is updated. For example, based on the security analysis performed as part of applying an automation plan to input data at 207, behavior definitions associated with generated operating system commands can be updated. In some embodiments, the updated behavior definitions are used to keep the dataset of behavior definitions fresh by expiring older definitions. In some embodiments, the updated dataset is used to train (or retrain) a machine learning model to identify valid behaviors associated with generated operating system commands.

Figure 3:
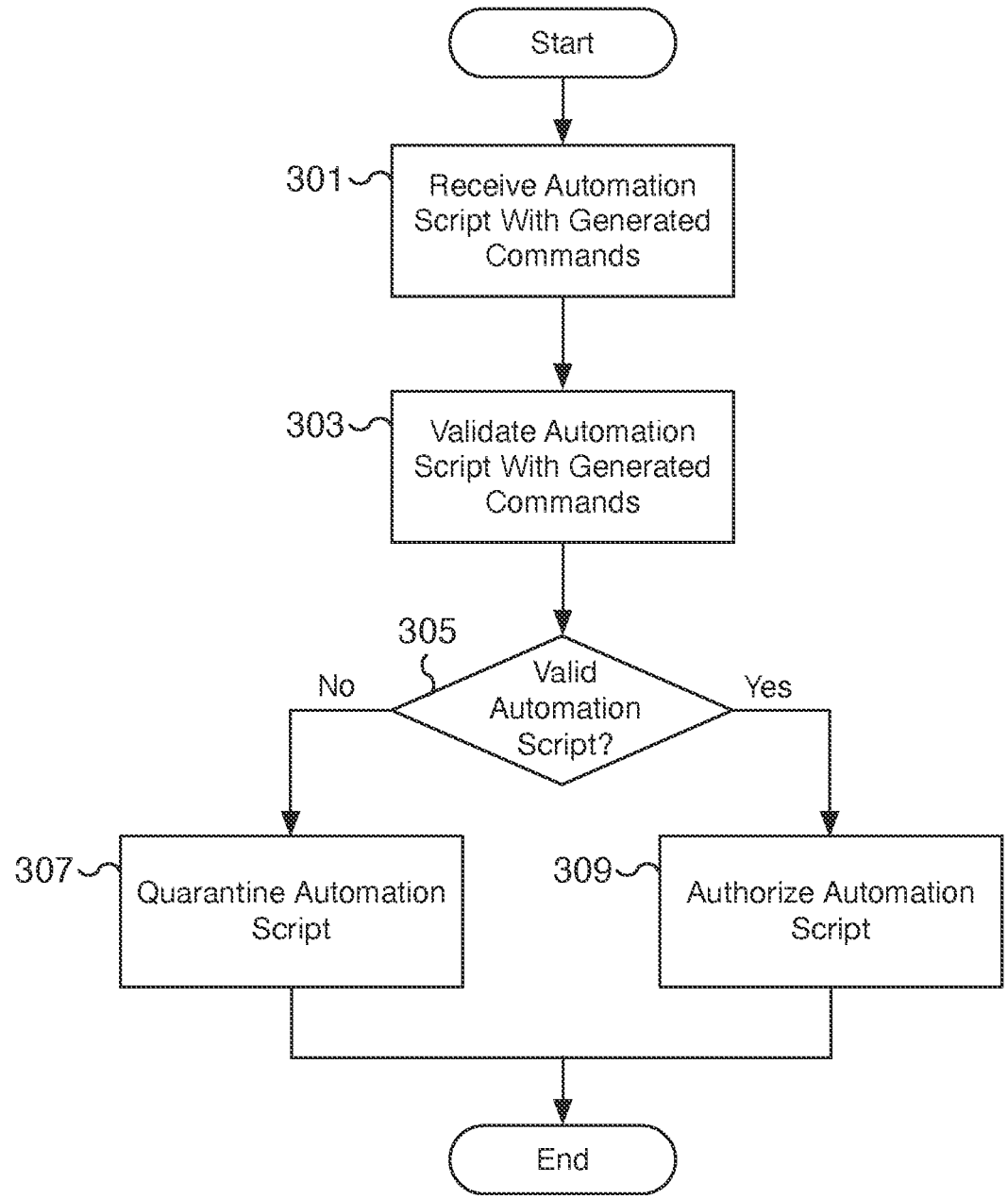
FIG. 3 is a flow chart illustrating an embodiment of a process for detecting security risks associated with automation scripts.

FIG. 3 is a flow chart illustrating an embodiment of a process for detecting security risks associated with automation scripts. Using the process of FIG. 3, an automation script is analyzed to identify security risks and either authorized or quarantined. In some embodiments, the process of FIG. 3 is performed at 207 of FIG. 2. In some embodiments, the process of FIG. 3 is performed by a security service running on a management server such as management server 121 of FIG. 1 and/or by a cloud service such as one of cloud services 101 of FIG. 1. Although described with respect to an automation script, the process of FIG. 3 applies to any execution script and can be utilized to detect security risks associated with operating system commands generated using dynamic input data.

At 301, an automation script with generated operating system commands is received. For example, a script that invokes one or more operating system commands on dynamic data is received. The generated operating system commands invoked by the automation script are utilized to process the input data but can be prone to security risks such as command line injection attacks.

At 303, the automation script with generated operating system commands is validated. For example, the automation script is analyzed to identify whether there are security risks associated with the generated operating system commands. In some embodiments, the automation script is parsed to create an execution tree and each generated operating system command included in the script has its own sub-tree in the execution tree. In some embodiments, generated operating system commands of the automation script are identified, and an execution tree is created for each generated operating system command. The execution trees can be analyzed to determine whether the predicted behavior of the generated commands match behavior definitions for valid (or invalid) uses of the corresponding commands. An automation script with valid generated commands is validated whereas an automation script that includes invalid generated commands is not validated. In some embodiments, the generated operating system commands are also sanitized to limited additional potential attacks.

At 305, a determination is made whether the automation script is valid. In the event the automation script is not valid based on the analysis at 303, processing proceeds to step 307. In the event the automation script is valid based on the analysis at 303, processing proceeds to step 309.

At 307, the automation script is quarantined. For example, an automation script is found to contain security risks associated with generated operating system commands. The automation script is quarantined and not authorized for execution. In some embodiments, the quarantine process includes notifying an operator, owner, and/or user of the automation script. The process can also include blocking the script from being executed and invalidating any network sessions, IP addresses, accounts, or other access privileges or user/client properties associated with the invalid automation script. In some embodiments, a timeout or throttling is imposed on any access privileges associated with invalid automation script, for example, until an incident team can address the identified security threat. In some embodiments, the invalid generated operating system commands are dropped from the automation script and corresponding alerts are triggered.

At 309, the automation script is authorized. For example, no security threats were identified at 305 with the generated operating system commands of the automation script and the automation script is authorized or approved for execution. In some embodiments, the automation script is prepared for execution by forwarding the script to be executed on the appropriate target machine(s). In some embodiments, the authorization includes granting access privileges to the appropriate input data and target machines.

Figure 4:
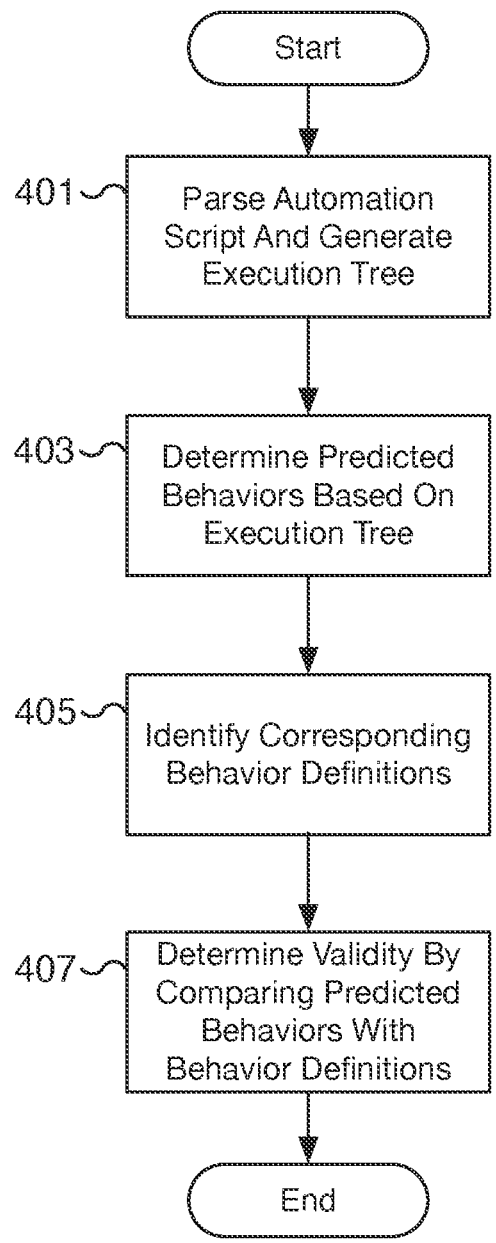
FIG. 4 is a flow chart illustrating an embodiment of a process for analyzing an automation script for security risks.

FIG. 4 is a flow chart illustrating an embodiment of a process for analyzing an automation script for security risks. Using the process of FIG. 4, an automation script is analyzed by parsing the script and generating one or more execution trees or sub-trees associated with generated operating system commands of the automation script. The predicted behavior of the generated operating system commands is compared to a behavior definitions dataset to validate the automation script. In some embodiments, the process of FIG. 4 is performed at 303 of FIG. 3 to validate an automation script by identifying security risks. In some embodiments, the process of FIG. 4 is performed by a security service running on a management server such as management server 121 of FIG. 1 and/or by a cloud service such as one of cloud services 101 of FIG. 1. Although described with respect to an automation script, the process of FIG. 4 applies to any execution script and can be utilized to detect security risks associated with operating system commands generated using dynamic input data.

At 401, an automation script is parsed, and an execution tree is generated. For example, an automation script is parsed to generate an execution tree that describes the execution order of the commands invoked within the script. In some embodiments, the generated execution tree is represented as an abstract syntax tree. A single execution tree can be generated for the entire automation script and each generated operating system command invoked by the script includes a sub-tree within the generated execution tree. In some embodiments, an execution tree is created for each generated operating system command of the automation script. For example, execution trees may be generated only for the generated commands identified by parsing the automation script.

At 403, behaviors associated with the automation script are predicted based on the generated execution tree. For example, the behavior of each generated operating system command invoked by the automation script is predicted by analyzing the corresponding execution tree of the generated operating system command. In some embodiments, the determined behavior includes predicting one or more metrics of the command. For example, by analyzing the execution tree of a generated operating system command, the number of spawned processes and the number of arguments passed to the command can be predicted. Other metrics can be predicted as well, such as the execution time, memory usage, CPU usage, network usage, and/or other properties. In some embodiments, the properties are predicted by virtualizing the command and executing each generated command in a virtual machine or sand box. In some embodiments, the behaviors including behavior metrics are determined by utilizing a trained machine learning model. For example, each generated operating system command can be used as input for the machine learning model to infer one or more metrics and/or security risks.

At 405, corresponding behavior definitions are identified. For example, for each generated operating system command, corresponding behavior definitions are identified from a behavior definitions dataset. In some embodiments, the behavior definitions dataset is the behavior definitions dataset created and updated at 201 and 209 of FIG. 2, respectively. For example, a behavior definition for a corresponding operating system command can specify the number of allowed processes the command spawns. Similarly, a behavior definition for a corresponding operating system command can specify the number of arguments the command receives. In various embodiments, the behavior definitions dataset is organized by operating system commands, and each command has one or more corresponding behavior definitions.

At 407, the validity of the automation script is determined by comparing the predicted behaviors to identified behavior definitions. For example, for each generated operating system command, the predicted behavior including predicted behavior metrics determined at 403 is compared with the corresponding behavior definitions for the command identified at 405. In some embodiments, the behavior definitions include valid behavior definitions used to validate a command. In some embodiments, the behavior definitions can include invalid behavior definitions used to invalidate a command. A command that matches a valid behavior definition is validated. Similarly, a command that matches an invalid behavior definition can be invalidated. In some embodiments, each generated operating system command is initially invalid and must be validated by matching a valid behavior definition. In the event all generated operating system commands are validated, the automation script is validated, and no security risk is identified. In the event one or more operating system commands are not validated, the automation script is not validated. For example, a generated operating system command with fewer or more predicted processes or input arguments would not match the corresponding behavior definitions and the automation script is invalidated due to an identified security risk. An invalid generated operating system command corresponds to an identified security risk. For example, a command predicted to spawn five processes when the corresponding behavior definition allows for only three processes is a security risk. The additional two extra processes can indicate a command line injection attack.

In some embodiments, the behavior definitions can include whitelist and/or blacklist information that allows and/or disallows certain approved or unapproved operating system commands from being executed. The behavior definitions can also specify access privileges such as users and/or target machines associated with the valid or invalid execution of the command.

Figure 5:
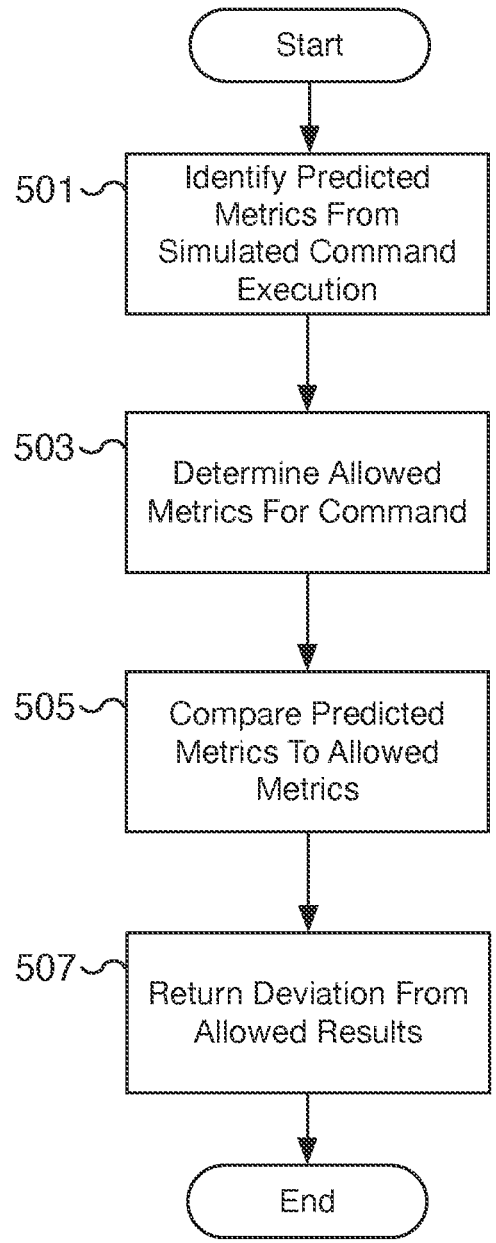
FIG. 5 is a flow chart illustrating an embodiment of a process for analyzing an operating system command for security risks.

FIG. 5 is a flow chart illustrating an embodiment of a process for analyzing an operating system command for security risks. Using the process of FIG. 5, an operating system command invoked by an automation script is analyzed by comparing predicted metrics of the command to allowed metrics specified by one or more behavior definitions. In some embodiments, the process of FIG. 5 is performed at 303 of FIG. 3 and/or at 403, 405, and/or 407 of FIG. 4 as part of the process of validating an automation script by identifying security risks. In some embodiments, the process of FIG. 5 is performed by a security service running on a management server such as management server 121 of FIG. 1 and/or by a cloud service such as one of cloud services 101 of FIG. 1.

At 501, predicted metrics from the simulated execution of a generated operating system command are identified. For example, the number of predicted spawned processes for a generated operating system command are identified. As another example, the predicted number of network connections or files accessed by a generated operating system command is identified. Other predicted metrics can be identified as appropriate. The predicted metrics can be identified by analyzing a simulation of the execution of the generated operating system command. In some embodiments, the simulated execution is represented by the parsed execution order of the command. For example, the command and its arguments can be parsed to create an execution tree such as an abstract syntax tree. In the example of predicted processes, an abstract syntax tree can be used to identify the number of predicted processes that will be spawned in the event the generated operating system command is executed.

At 503, the allowed metrics for the generated operating system command are determined. For example, the allowed metrics are determined by identifying matching behavior definitions for the command and retrieving the associated metrics. A behavior metric for an operating system command can specify the allowed number of processes the command will spawn. As additional examples, behavior metrics for an operating system command can specify the number of files a command can access in write mode, the number of arguments the command can receive, and/or the number of network connections the command can open, among others. In various embodiments, the allowed metrics can be approved by an operator and/or by supervising the execution of corresponding automation scripts in a secure environment.

At 505, the predicted metrics are compared to the allowed metrics. For example, each corresponding metric from the predicted metrics and allowed metrics is compared. In some embodiments, the number of predicted spawned processes is compared to the number of allowed processes. Similarly, the number of predicted input arguments can be compared to the number of allowed input arguments. For each metric, the allowed metric may be an allowed value or an allowed range of values. In various embodiments, every allowed metric is compared with a predicted value for the generated operating system command.

At 507, the deviation from the allowed results are returned. In some embodiments, any deviations in the comparisons between predicted and allowed metrics at 507 are returned and can be used for further processing. For example, a deviation in the number of spawned processes can be used to generate an alert to an operator as part of a quarantine process. Similarly, if excess processes are predicted, the predicted processes can be used to identify whether a security breach has occurred and/or used to create/update the valid (or invalid) behavior definitions. In some embodiments, the validity of the generated command is returned along with the deviation. For example, in the event each predicted metric matches each valid behavior metric, the command is validated. Otherwise, the command may be invalidated. In various embodiments, each deviation in metrics represents an identified security risk associated with the generated operating system command.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving input data for an operating system command of an automation process;
generating the operating system command based on the received input data;
predicting one or more metrics of the generated operating system command, wherein the predicted one or more metrics include a predicted count of a number of one or more processes predicted to be spawned by the generated operating system command, and wherein the predicted count of the number of one or more processes of the generated operating system command is predicted using a machine learning model prior to execution of the generated operating system command; and
automatically evaluating the predicted one or more metrics to determine a security risk associated with the generated operating system command, including by determining whether the predicted count of the number of the one or more processes deviates from a comparison number of processes determined using a dynamically updated behavior definition.

2. The method of claim 1, wherein determining the security risk includes determining whether to allow execution of the generated operating system command.

3. The method of claim 2, further comprising:
forwarding the generated operating system command for execution on a remote client.

4. The method of claim 1, further comprising:
comparing the generated operating system command with one or more approved operating system commands.

5. The method of claim 1, wherein automatically evaluating the predicted one or more metrics includes comparing the predicted one or more metrics with one or more historical reference metrics.

6. The method of claim 5, further comprising:
approving the generated operating system command; and
updating a behavior definitions dataset using the approved generated operating system command in association with the predicted one or more metrics.

7. The method of claim 5, wherein a reference metric of the one or more historical reference metrics is expired after the reference metric exceeds an aging threshold.

8. The method of claim 1, wherein predicting the one or more metrics includes creating an abstract syntax tree representing the generated operating system command.

9. The method of claim 1, wherein the predicted one or more metrics include a count of a number of one or more arguments of the generated operating system command.

10. The method of claim 9, wherein the one or more arguments include user specified data included in the received input data and the operating system command is automatically generated to include the one or more arguments.

11. A method, comprising:
receiving input data for one or more operating system commands of an automation script;
generating the one or more operating system commands based on the received input data;
parsing the automation script to create an execution tree, wherein the execution tree includes the one or more generated operating system commands;
for each of the one or more generated operating system commands:
predicting one or more metrics for the generated operating system command, wherein the one or more metrics include a predicted count of a number of one or more processes predicted to be spawned by the generated operating system command, and wherein the predicted count of the number of one or more processes of the generated operating system command is predicted using a machine learning model prior to execution of the generated operating system command; and
automatically evaluating the predicted one or more metrics to determine a security risk associated with the automation script, including by determining whether the predicted count of the number of the one or more processes deviates from a comparison number of processes determined using a dynamically updated behavior definition; and
identifying the security risk associated with the automation script.

12. The method of claim 11, further comprising:
generating a security notification; and
quarantining the automation script.

13. The method of claim 11, further comprising:
blocking an IP address, disabling an account, blocking an email address, or invalidating a session associated with a client requesting an execution of the automation script.

14. A system, comprising:
one or more processors; and
a memory coupled to the one or more processors, wherein the memory is configured to provide the one or more processors with instructions which when executed cause the one or more processors to:
generate an operating system command based on the received input data;
predict one or more metrics of the generated operating system command, wherein the predicted one or more metrics include a predicted count of a number of one or more processes predicted to be spawned by the generated operating system command, and wherein the predicted count of the number of one or more processes of the generated operating system command is predicted using a machine learning model prior to execution of the generated operating system command; and
automatically evaluate the predicted one or more metrics to determine a security risk associated with the generated operating system command, including by causing the one or more processors to determine whether the predicted count of the number of the one or more processes deviates from a comparison number of processes determined using a dynamically updated behavior definition.

15. The system of claim 14, wherein determining the security risk includes determining whether to allow execution of the generated operating system command.

16. The system of claim 14, wherein the memory is further configured to provide the one or more processors with additional instructions which when executed cause the one or more processors to:
forward the generated operating system command for execution on a remote client.

17. The system of claim 14, wherein automatically evaluating the predicted one or more metrics includes comparing the predicted one or more metrics with one or more historical reference metrics.

18. The system of claim 14, wherein predicting the one or more metrics includes creating an abstract syntax tree representing the generated operating system command.

19. The system of claim 14, wherein the predicted one or more metrics include a count of a number of one or more arguments of the generated operating system command.

20. The system of claim 19, wherein the one or more arguments include user specified data included in the received input data and the operating system command is automatically generated to include the one or more arguments.

* * * * *